Figure 1:
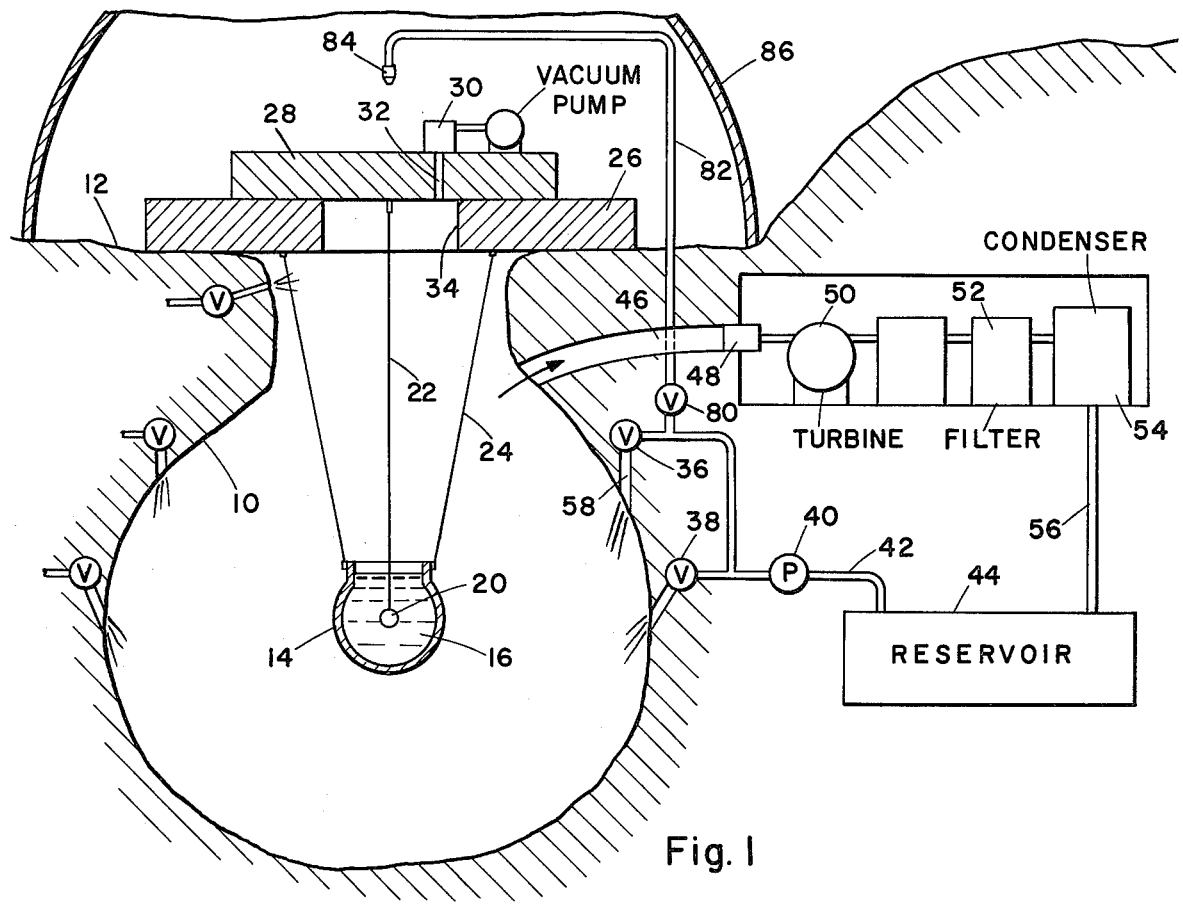

United States Patent [19]

Rosciszewski

[11] 3,921,405
[45] Nov. 25, 1975

[54] METHOD AND APPARATUS FOR GENERATING STEAM BY NUCLEAR EXPLOSION WITH SUPPRESSED RADIATION AND BLAST EFFECTS

[76] Inventor: Jan J. Rosciszewski, 4784 Panaroma Drive, San Diego, Calif. 92116

[22] Filed: Dec. 19, 1973

[21] Appl. No.: 426,050

[52] U.S. Cl. ........................ 60/644; 176/39
[51] Int. Cl. .................... F01k 21/00; F03g 7/00
[58] Field of Search ............ 60/644; 165/45; 176/39

[56] References Cited
UNITED STATES PATENTS
3,640,336  2/1972  Dixon .............................. 165/45 X
3,765,477  10/1973  Van Huisen ...................... 165/45

OTHER PUBLICATIONS
Exploding Reactions for Power, by Edward F. Marwick, Jan. 27, 1973, Julia Marwick Books, 320 Happ Road, Northfield, Ill. 60093, pp. 8 and 9.

Primary Examiner—Martin P. Schwadron
Assistant Examiner—Allen M. Ostrager
Attorney, Agent, or Firm—Brown & Martin

[57] ABSTRACT

The generating of steam by exploding a thermonuclear bomb in an expansion chamber in a breakable container filled with working fluid or solid that is placed in the expansion chamber that is then evacuated, and after initiating the thermonuclear explosion, utilizing the energy released to directly evaporate the enclosing working fluid or solid and expanding it in the much larger chamber volume to pressure and temperatures suitable for a power generation.

19 Claims, 2 Drawing Figures

METHOD AND APPARATUS FOR GENERATING STEAM BY NUCLEAR EXPLOSION WITH SUPPRESSED RADIATION AND BLAST EFFECTS

BACKGROUND OF THE INVENTION

The present need for new sources of cheap and inexpensive power is well known. One of the power sources that is expected to fill this need is nuclear power. However nuclear power systems require complicated mechanisms to utilize the high heat generated. Further, with fission type nuclear reactions that are presently used in power systems, the problems of radiation have to be adequately handled, further restricting the use of such systems. On top of that there is always a danger of an explosion. The use of a thermonuclear reaction has many advantages, such as high heat, low cost fuel and low radiation. However this source of energy has not been able to be effectively used for power generation because of the difficulty in obtaining high temperatures to initiate the required reaction and to confine the plasma in order to extract the power. It is estimated on the basis of present knowledge that it will take over 25 years and well over 20 billion dollars of research and development to effectively apply controlled theremonuclear reactions for power generation. The only successfully employed thermonuclear reaction of a hydrogen bomb with a uranium fuse, has not been used as a power source because of the devastating effects of the explosion.

Thus it is advantageous to have a method and apparatus for converting the energy of the explosion of a thermonuclear bomb into the internal energy of steam, and at the same time to ease or cancel entirely the destructive effects of the explosion and radiation. This allows the use of practically unlimited, already existing, energy sources for power generation that with present technological capabilities, can be accomplished with less investment cost, pollution and safety problems than the presently available nuclear steam generators.

In using large thermonuclear bombs, the contribution of the uranium or plutonium fuse to radiation will be smaller and the reaction will approach approximate "clean" conditions of pure thermonuclear reactions. In deuterium-tritium reactions that result in the area of 17.6 Mev energy releases, about 80 percent goes into fast neutrons. The method and apparatus of this invention slows down these neutrons in a working fluid, most effectively by collisions with light atoms such as hydrogen, that converts their energy into thermal energy. For this reason water seems to be a very convenient medium to use as the working fluid.

SUMMARY OF THE INVENTION

In an embodiment of this invention, a power generating facility such as one generating steam, employs a large expansion chamber. This chamber may comprise an evacuated underground chamber in hard rock that may be lined with concrete or steel and insulating material. A smaller breakable container is positioned at or near the center of the expansion chamber and is filled with a working fluid such as water, ice, or other suitable materials. A thermonuclear bomb is positioned in the container and surrounded by the working fluid or solid in the smaller container. The space around the container is evacuated and the uranium fuse is then exploded, initiating the thermonuclear explosion. The energy released by this explosion is directly used to evaporate and heat up the surrounding fluid or solid. The heating is accomplished through energy deposition by slowed-down, fast neutrons, absorption of bremsstrahlung radiation and the shock wave propagating from the center of the explosion. The resulting very hot working gas will expand in the substantially evacuated, large expansion chamber. Such an expansion is associated with inward propagation of the cooling rarefaction wave. The transferring of the explosion energy to the large volume of the working fluid, which is free to expand to a larger volume with only small initial pressure, reduces the force of the blast wave against the chamber wall removing the danger of wall damage and reducing substantially the external shocks. If desired, the chamber walls can be protected during the explosion from radiation by the fireball of the working gas by spraying a small amount of the working fluid tangentially against the chamber walls. By providing an expansion volume large enough and to provide a small initial pressure, the blast wave at the wall is very weak and the expansion process is close to the adiabatic one.

The fast neutrons and bremsstrahlung radiation are practically stopped within a few meters of the mass of the working fluid. The classic fireball is cooled off by the working fluid at its formation and the neutron radiation is stopped. Because of the very short, mean-free collision time of the fast neutrons, their flight is much shorter than the characteristic hydrodynamic time. So the typical time for instability of the working fluid immediately surrounding the thermonuclear device, will be much longer and all neutrons and bremsstrahlung energy will be deposited in the fluid sphere before it has time to move. Also because of the hot interior and colder exterior, the characteristic time is longer for exterior and therefore shock heating will be symmetric. In the case were the working fluid is water, half the decay time of the oxygen isotope $O^{19}$ created by a neutron bombardment is only 29 seconds, and therefore this greatly reduces any radioactivity problem, compared to the case where heavy wall material is exposed to fast neutron radiation in conventional nuclear explosions. The addition of boron in the container material will serve the role of a thermal neutron absorber.

The large volume of steam generated by the system can be used to drive any prime mover such as turbines or the like, depending on the total amount of steam generated and the rate of steam used. The energy losses by heat conduction through the chamber walls can be reduced by insulating the walls. However the internal surface of rock or concrete is not a good heat conductor anyway. In order to provide a continuous work output, two or more chambers may serve one power station with one being reloaded while the other is operating.

It is therefore an object of this invention to provide a new and improved method and apparatus of providing steam generation through the use of nuclear explosions and reducing almost entirely the devastating effects of the explosion.

Other objects and many advantages of this invention will become more apparent upon a reading of the following detailed description and an examination of the drawing, wherein like reference numerals designate like parts throughout and in which, FIG. 1 is a side plan view in section of one embodiment of the invention.

Figure 2:
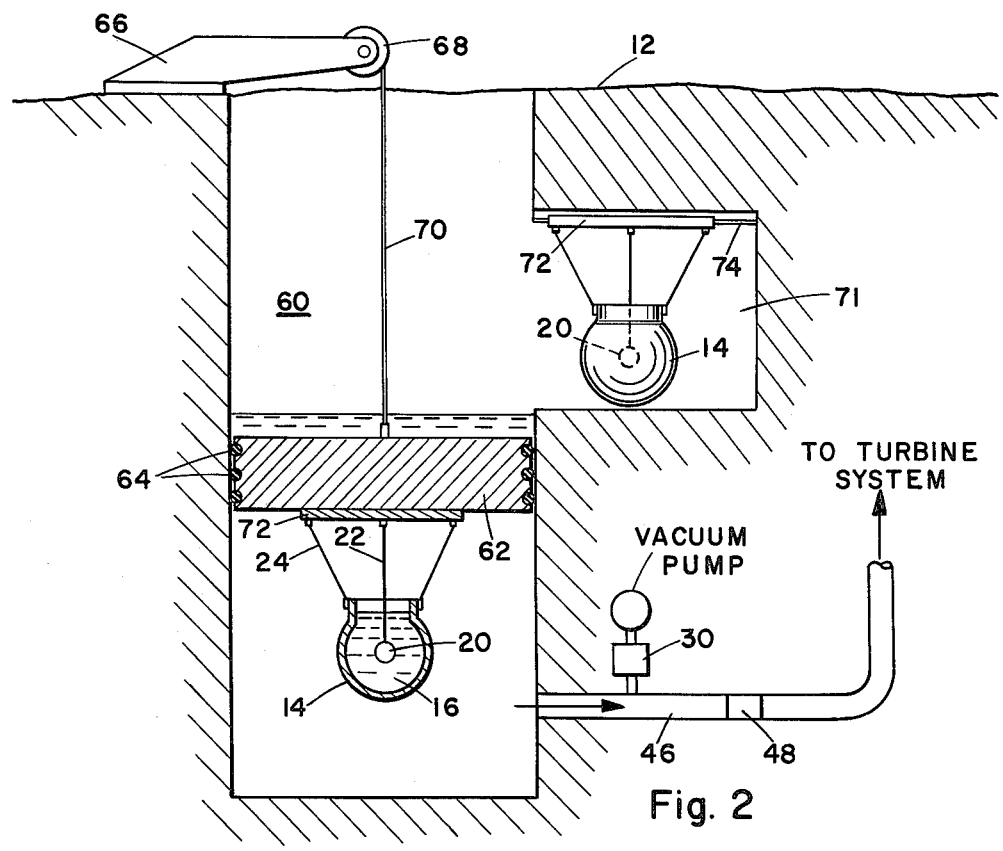

FIG. 2 is a side plan view in section of a modified embodiment of the invention.

Referring now to FIG. 1 in the drawing, a chamber 10 is hollowed out of the earth 12. Preferably the expansion chamber is hollowed out of solid rock. If this is not possible, then the chamber may be lined with cement, steel or other suitable strong and insulative materials. The upper opening of the container 10 may be closed by, for example, a heavy cap 26 that may be made of cement or other suitable materials, or may be made of heavy steel. Generally the weight of the cap 26 is sufficient to hold the cap in place against the expected 40 atmospheres or so of pressure within the container 10. However, it may be understood that the cap 26 may be held down against the ground 13 with any suitable connection in any known and suitable manner. Further, an upper plate 28 is removable and covers opening 34 for insertion of the container 14 therethrough. A cover 86 covers the area during the opening of the chamber 10, thus preventing any contamination of the ambient air. A vacuum pump 30 draws a low pressure in container 10 through channel 32.

Suspended in the expansion chamber 10 is a container 14 that holds a first working fluid 16 with a nuclear bomb 20 positioned therein and supported by a firing line 22. Lines 24 support the container 14 in the known manner. When the bomb 20 is exploded, the working fluid is vaporized and expands outwardly into the substantially evacuated volume of the chamber 10. The steam generated in the cavity 10 passes through a conduit 46 and a control valve 48 into a turbine 50 and through a filter 52 to a condenser 54. The sump of the condensor 54 drains through line 56 to a reservoir 44. The fluid is then pumped by pump 40 through line 42, valve 80, line 82 and nozzle 84 into the container 14, during successive operations. Further working fluid is also pumped, when desired, through valves 36 and 38 to spray fluid on the wall of the chamber 10. Valves 36 and 38 have check-valve portions that prevent back pressure from being blown through the system as a result of the explosion of the thermonuclear device 20, a similar function that is served by a pressure flow control in valve 48. Nozzles 58 are set to spray the working fluid tangentially against the inner surface of the cavity 10, for a purpose that will be explained in more detail hereinafter.

In operation, the upper plate 28 is removed from cap 26 and a thermonuclear device in container 14 and working fluid 16 is lowered into the cavity 10. The working fluid 16 may be any suitable fluid, and is preferably water. Water is then inserted from reservoir 44 through line 82. The vacuum pump 30 is then activated to draw a vacuum in the remaining space of the cavity 10. The thermonuclear device is then exploded, disintegrating the container 14 and vaporizing the working fluid 16 and expanding it into the much later volume of the chamber 10, creating steam in the chamber that can, for example, be at a pressure of about 40 atmospheres. This steam is then conducted through conduit 46 and valve means 48 to operate the turbine 50 in the closed system. It may be understood that the fluid may be discharged and new fluid used in the system through reservoir 44.

The container 14 and working fluid 16 may be ice, or the working fluid 16 may be water with container 14 being of aluminum, manganese, ice or other suitable materials. Such materials may comprise or contain boron for absorption of thermal neutrons. Preferably the container 14, except when it is made out of ice, is made of materials that condense at a high temperature higher than the final chamber temperature, and do not present a problem of condensing in the turbine 50. Small amounts of the working fluid may be directed through lines 58 onto the inner surface of the cavity 10 to protect the explosion chamber 10 from radiation from the fireball of hot working gases. However, this is not absolutely necessary.

In the embodiment illustrated in the FIG. 2, the cavity 60 comprises a cylinder in which is positioned a movable piston 62 having sealing O-rings 64. The explosion of the thermonuclear device 20 occurs in cavity 61 in the same manner previously described. The steam then passes through conduit 46 to the turbine system. The function of the piston 52 is to be lowered on line 70 by pulley 68 and boom 66 to maintain the pressure of the steam or working gas, against it being drawn through line 46. A cooling fluid 65 is normally positioned above the heavy piston 62 and leaks slowly before the pressure created by the explosion pushes the O-rings against the gap between the piston and the cylinder, sealing the system.

An opening 71 in the side of cavity 60 provides a location for positioning, recharging chambers 14. The piston 62 is pulled by pulley 68 and line 70 to a position above opening 71 and the new plate 72 is moved on track 74 for replacement of the old place 72, with all of this being accomplished in the enclosed environment.

In an example of an operation of the invention, a hydrogen bomb may be used that has an energy yield of $2 \times 10^{15}$ joules, equivalent roughly to 100 K ton of TNT. Such a charge is built with approximately 90 percent contribution of a thermonuclear reaction and 10 percent of uranium explosion (90 percent pure bomb). In using $1.5 \times 10^7$ kg of water as a working fluid, the smaller spherical container will have a radius of approximately 16 meters and the larger expansion chamber will have a radius of 100 meters. Upon explosions, the initial water fireball (before expansion) has a temperature in the order of $3 \times 10^4$ °C and after expansion (assuming average $\gamma = c_p/c_i = 1.5$) a temperature of about 2000 °C and a pressure of about 40 atmospheres. By increasing the yield of the explosion, a higher pressure is obtained. In order to obtain a lower temperature and higher pressure, more water is used in a smaller chamber. The use of a 99 percent pure theremonuclear bomb of 1 Megaton yield with the same final temperature and pressure as in the foregoing example, requires an initial mass of water of $1.5 \times 10^8$ kg and an expansion chamber with a radius of a little over 200 meters. It is estimated that generated steam by such an explosion will be sufficient to generate power for Los Angeles county for one week.

Having described my invention, I now claim:

1. A steam generator using a nuclear explosion to provide steam comprising, a large sealed expansion chamber, means for substantially evacuating said chamber, means for suspending a nuclear bomb in substantially the center of the chamber in a surrounding working fluid, said working fluid being spaced from the wall of the chamber, means for substantially evacuating gases from said chamber around said working fluid, means for exploding the bomb causing the bomb to generate heat vaporizing the working fluid and making steam and expanding it to a much larger volume to obtain desirable pressures and temperatures for power generation, and means for conducting the steam into a power generator.

2. A steam generator as claimed in claim 1 wherein, said working fluid is water, and said suspending means includes a container suspended in said expansion chamber for holding said working fluid and said bomb.

3. A steam generator as claimed in claim 2 wherein, said container being made of an easily vaporizable light material such as aluminium or magnesium or boron-carbide or water-ice.

4. A steam generator as claimed in claim 1 wherein, said working fluid is water or water-ice, and said suspending means comprising a container made of ice that is suspended in said expansion chamber.

5. A steam generator as claimed in claim 1 wherein, said working fluid portion is ice.

6. A steam generator as claimed in claim 1 wherein, said working fluid is water.

7. A steam generator as claimed in claim 1 wherein, said expansion chamber having an opening with a removable cover at the upper end thereof for inserting theremonuclear bombs and working fluid for repetitive steam generating operations.

8. A steam generator as claimed in claim 7 including, valve means in said conducting means for selectively setting the pressure or temperature of the steam passing into the power generator.

9. A steam generator as claimed in claim 1 wherein, said expansion chamber comprises an elongated cylinder, said cylinder having a heavy piston for slidably moving in said cylinder, seal means for sealing said piston in the sliding movement in said cylinder, and means for selectively lowering the piston into the cylinder after the nuclear explosion for maintaining the steam in the cylinder at a given operational pressure.

10. A steam generator as claimed in claim 1 wherein, means in said chamber for continually reducing the volume of the chamber as the steam generated in the chamber is being used maintaining the steam at a desired operating pressure.

11. A steam generator as claimed in claim 1 wherein, said chamber comprising a large cavity cut into rock in the earth.

12. A steam generator as claimed in claim 1 wherein, said nuclear bomb having an energy upon explosion related to the size of the chamber and the amount of the working fluid as to provide steam generation in the desirable pressure and temperature range for power generation.

13. The method of generating steam in an enclosed chamber using a thermonuclear explosion comprising the steps of, placing an atomic bomb, such as a hydrogen bomb, in the chamber and surrounding the immediate area of the bomb with a working fluid, which working fluid is spaced from the wall of the chamber, substantially evacuating the container, exploding the bomb, using the heat to convert the working fluid that is expanded to a much larger volume, and directing the steam through a prime mover for generating power.

14. The method as claimed in claim 13 including the step of, surrounding the bomb with a water working fluid enclosed in a suspended container.

15. The method as claimed in claim 13 including the step of, enclosing the bomb with a working fluid of ice.

16. The method as claimed in claim 13 including the step of, gradually reducing the volume of the chamber after the explosion and while the vaporized working fluid is being employed to drive a prime mover to maintain the continued pressure of the vaporized working fluid above a given pressure.

17. The method as claimed in claim 13 being characterized by, said expansion chamber comprising a large hole in rock in the earth, and said container comprising a vaporizable material such as aluminium, magnesiu, ice or boron-carbide.

18. The method as claimed in claim 13 including the step of, spraying a small amount of the working fluid against the inner surface of the container prior to exploding the bomb.

19. The method as claimed in claim 13 including the step of, adjusting the size of the bomb and the volume of the working fluid which is water and the size of the expansion chamber to obtain desirable steam pressures and temperatures for generating power.

* * * * *